No. 769,530. PATENTED SEPT. 6, 1904.
C. S. BLAKER.
CLAMP FOR WELDING TIRES.
APPLICATION FILED MAY 14, 1904.
NO MODEL.
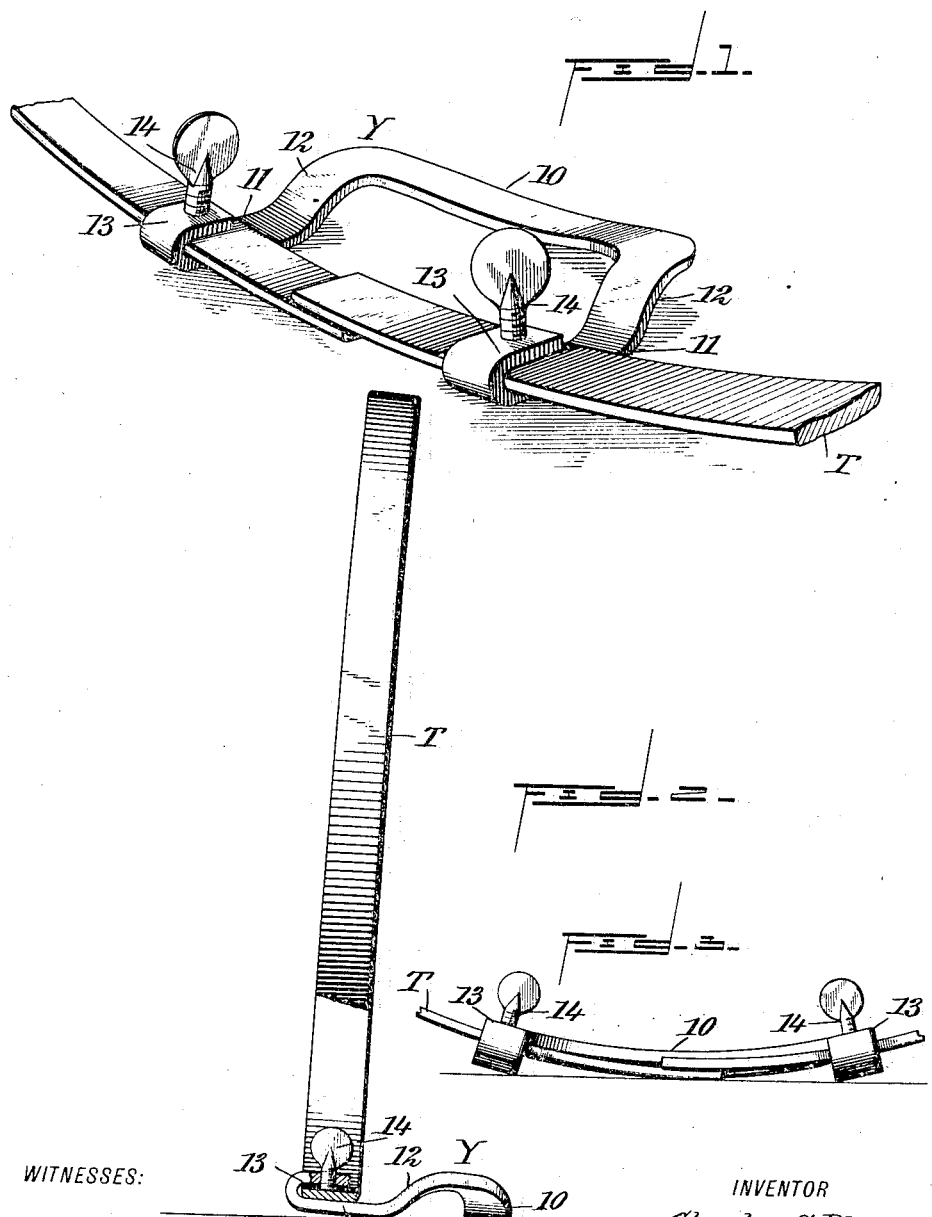
WITNESSES:
INVENTOR
Charles S. Blaker
BY
ATTORNEYS No. 769,530.

Patented September 6, 1904.

UNITED STATES PATENT OFFICE.

CHARLES S. BLAKER, OF WORTH, MISSOURI, ASSIGNOR OF ONE-HALF TO EDWARD WEIDMAN, OF COBURG, IOWA.

CLAMP FOR WELDING TIRES.

SPECIFICATION forming part of Letters Patent No. 769,530, dated September 6, 1904.

Application filed May 14, 1904. Serial No. 207,951. (No model.)

*To all whom it may concern:*

Be it known that I, CHARLES S. BLAKER, a citizen of the United States, and a resident of Worth, in the county of Worth and State of Missouri, have invented a new and Improved Clamp for Welding Tires, of which the following is a full, clear, and exact description.

My invention relates to clamps for use in heating and welding tires; and its principal objects are to provide such a device for holding the ends of tires in their proper relation for making a lap-weld, enabling the smith to dispense with the services of a helper.

It consists in the various features hereinafter described and claimed.

Reference is to be had to the accompanying drawings, forming a part of this specification, in which similar characters of reference indicate corresponding parts in all the figures.

Figure 1 is a perspective view of one embodiment of my invention, showing a tire held by it in position for welding. Fig. 2 is an end elevation thereof, and Fig. 3 is a side elevation looking from the left in Fig. 2.

Y designates a yoke which, as here illustrated, consists of a bar 10 of suitable metal, preferably of flattened form and having at each end an arm 11, extending substantially at right angles from it. Each arm is inclined from the general plane of the bar at 12, so that the outer end will lie in a plane approximately parallel to that of the bar. At the outer extremity of each arm is a clamp, here shown as integral with the yoke and formed by bending the arm back at 13. Through the clamp members 13 operate set-screws 14, serving to force the work against the opposite side. The faces of the clamp members opposite these screws preferably lie in substantially the arc of a circle, this lending itself to the easy introduction of the bent tire T and maintaining the same in practically its true curvature. The proper positioning of these clamps may be effected by bending the bar 0 as is here illustrated, the curvature being that of the arc upon which it is desired the clamp members shall lie. The parts are so proportioned that the lower side of the curved bar approaches the general plane of the clamps, as is particularly shown in Fig. 2 of the drawings. This brings the device into contact with the surface upon which it may rest at separated points, furnishing a stable support, which facilitates the introduction of the tire and the operation upon it.

In use the tire is bent and its ends introduced into the clamps with the lapped portion lying between them and there secured by turning down the screws, the introduction being aided by the inclined portions of the arms at 12, which guide the tire into place. It is now ready for welding or any operation which it may be desired to perform upon it.

Having thus described my invention, I claim as new and desire to secure by Letters Patent—

1. A clamp for welding tires comprising a yoke, the opposite arms of which extend back upon themselves to furnish a clamp, and a set-screw extending through each clamp.

2. A clamp for welding tires comprising a bar having arms inclined from the general plane thereof, then extending outwardly and finally back upon themselves, and screws threaded through the last-named portions.

3. A clamp for welding tires comprising a bar having the form of an arc of a circle and being provided with arms inclined from the general plane of said bar to an amount approximating its curvature, then extending outwardly and finally back upon themselves, and screws threaded through the last-named portions.

In testimony whereof I have signed my name to this specification in the presence of two subscribing witnesses.

CHARLES S. BLAKER.

Witnesses:
V. E. CALDWELL,
G. W. ZIMMERMAN.